United States Patent [19]

Mizutani et al.

[11] 4,267,084

[45] May 12, 1981

[54] VINYL CHLORIDE POLYMER BLEND COMPOSITION

[75] Inventors: Yukio Mizutani; Katsuo Mitani; Takashi Maehara, all of Tokuyama, Japan

[73] Assignee: Tokuyama Soda Kabushiki Kaisha, Yamaguchi, Japan

[21] Appl. No.: 81,070

[22] Filed: Oct. 2, 1979

[30] Foreign Application Priority Data

Oct. 3, 1978 [JP] Japan .................. 53-121175

[51] Int. Cl.³ ............................................ C08L 27/06
[52] U.S. Cl. ........................ 260/23 XA; 260/45.75 V; 260/457 P; 260/45.95 R; 260/42.49; 525/212; 525/227; 525/233; 525/239
[58] Field of Search ................... 525/212, 239; 260/23 XA, 45.75 V

[56] References Cited

U.S. PATENT DOCUMENTS 3,711,576  1/1973  Hwa ..................................... 525/239
3,956,251  5/1976  Feiler et al. .......................... 525/239

FOREIGN PATENT DOCUMENTS 37-6978   7/1962  Japan .
52-117365 10/1977 Japan .
52-117366 10/1977 Japan .

OTHER PUBLICATIONS

Jour. of App. Polymer Sci., vol. 12, No. 5, May 1968, Pezzin et al., pp. 1119-1136.
Journal of App. Polymer Sci., vol. 18, 1974, Martin et al., pp. 257-266.

*Primary Examiner*—Carman J. Seccuro
*Attorney, Agent, or Firm*—Sherman & Shalloway

[57] ABSTRACT

The present invention provides a vinyl chloride polymer composition comprising an intimate mixture of a first vinyl chloride polymer containing a sulfide linkage in the molecular chain and a second vinyl chloride polymer having a higher molecular weight than the first polymer, and a process for producing a first vinyl chloride polymer for use in the composition, comprising polymerizing vinyl chloride or a mixture of vinyl chloride and an ethylenically unsaturated monomer in the presence of a free radical initiator using as a chain transfer agent a mercapto compound or a disulfide compound. Said vinyl chloride polymer composition has been improved in heat stability and processability.

18 Claims, No Drawings

VINYL CHLORIDE POLYMER BLEND COMPOSITION

This invention relates to a vinyl chloride polymer composition, and more specifically to a vinyl chloride polymer composition having improved heat stability and processability.

Polyvinyl chloride has a number of excellent properties including strength, chemical resistance and weatherability, but has the serious defect of poor processability. Since the polyvinyl chloride has inferior stability to heat and light, it undergoes heat decomposition owing mainly to dehydrochlorination during molding at elevated temperatures and during use after molding, thus discoloring the molded articles and deteriorating their properties.

It has been known to add various stabilizers to polyvinyl chloride in order to inhibit its thermal decomposition during molding and use. However, when large amounts of heat stabilizers are added, the polyvinyl chloride tends to be deteriorated in processability and in the mechanical strength of molded articles produced therefrom. This also has the defect that the stabilizer added tends to bleed out onto the surface of a molded article during use to cause surface chaulking.

A method has also been known which involves mixing polyvinyl chloride resins having different degrees of polymerization in order to improve the processability, and flowability characteristics such as the rate of extrusion of polyvinyl chloride.

For example, Japanese Patent Publication No. 6978/62 discloses a hard vinyl chloride polymer composition for injection molding comprising a mixture of 85 to 50 parts by weight of a vinyl chloride polymer having an average degree of polymerization of 200 to 500 and 15 to 50 parts by weight of a vinyl chloride polymer having an average degree of polymerization of 700 to 1500. The results given in Experimental Example 1 of this Publication show that a composition composed of a vinyl chloride polymer having an average degree of polymerization of 815 and a vinyl chloride polymer having an average degree of polymerization of 385 increases in flow rate as the proportion of the vinyl chloride polymer having a lower degree of polymerization increases. It is also stated that the heat distortion temperature of the composition is much the same as that of the vinyl chloride polymer having a higher degree of polymerization if the proportion of the vinyl chloride polymer having a lower degree of polymerization is at least 25% by weight. The specification of this Japanese Publication also states that vinyl chloride polymers having a lower degree of polymerization unexpectedly have good heat deformability.

Vinyl chloride polymer compositions composed of a vinyl chloride resin having a high molecular weight and a vinyl chloride resin having a low molecular weight are also described, for example, in Japanese Laid-Open Patent Publication No. 117365/77, Japanese Laid-Open Patent Publication No. 117366/77, and J. Appl. Polym. Sci., 12, 1119 (1968), and ibid. 18, 257 (1974).

To the best of the knowledges of the present inventors, none of the prior literature references including the above-cited references disclose the relation between a sulfide-linkage containing lower-molecular-weight vinyl chloride polymer employed and the heat stability of the resulting polymer composition.

Investigations by the present inventors have shown that a vinyl chloride polymer composition having satisfactory heat stability cannot be obtained by merely mixing a vinyl chloride polymer having a high molecular weight and a vinyl chloride polymer having a low molecular weight with particular attention given only to the molecular weights of these polymers.

It is an object of this invention to provide a vinyl chloride polymer composition having excellent heat stability and processability.

Another object of this invention is to provide a vinyl chloride polymer composition having superior heat stability and processability by mixing a first vinyl chloride polymer containing a sulfide linkage in the polymer chain with a second vinyl chloride polymer having a higher molecular weight than the first vinyl chloride polymer.

Other objects of this invention will become apparent from the following description.

The objects and advantages of this invention are achieved in accordance with this invention by a vinyl chloride polymer composition comprising an intimate mixture of a first vinyl chloride polymer containing a sulfide linkage in the polymer chain and a second vinyl chloride polymer having a higher molecular weight than the first vinyl chloride polymer.

The vinyl chloride polymer composition of this invention is used conveniently in extrusion molding, injection molding, etc. because it has markedly increased heat stability and superior processability.

The vinyl chloride polymers used in this invention, whether of low or high molecular weights, are easily produced by ordinary suspension polymerization, emulsion polymerization, bulk polymerization, and the like.

The vinyl chloride polymer, as referred to herein, denotes not only a homopolymer of vinyl chloride (polyvinyl chloride), but also copolymers of vinyl chloride with other ethylenically unsaturated monomers.

Preferred vinyl chloride copolymers are those having at least 70% by weight, especially at least 80% by weight, of a vinyl chloride monomer unit.

The ethylenically unsaturated comonomers copolymerizable with vinyl chloride may be a variety of known compounds. Typical examples include olefinic compounds such as ethylene and propylene, vinyl esters such as vinyl acetate and vinyl propionate, unsaturated carboxylic acids and the esters or amides thereof such as acrylic acid, α-alkylacrylic acids, methacrylic acid, methyl acrylate, glycidyl methacrylate, α-ethylhydroxymethacrylic acid and acrylamide, unsaturated nitriles such as acrylonitrile, unsaturated dicarboxylic acids and acryloyl esters thereof such as maleic acid and fumaric acid, and vinyl alkyl ethers such as vinyl methyl ether and vinyl ethyl ether.

The first vinyl chloride polymer having a lower molecular weight used in this invention has a sulfide linkage in the polymer chain. Preferably, this polymer contains a sulfide linkage of the following formula

    (A)

wherein R is a monovalent organic radical, in the polymer chain. Especially preferably, the first vinyl chloride polymer contains 0.01 to 2% by weight, especially 0.05 to 1% by weight, of a sulfur atom of the sulfide linkage.

There is no particular restriction on the method of forming such a sulfide linkage at the polymer chain. Generally, it is preferable to polymerize a vinyl chloride monomer or a mixture of a vinyl chloride monomer with another ethylenically unsaturated monomer in the presence of a free-radical initiator using as a chain transfer agent a mercapto compound having one or two mercapto groups, of the following formula

wherein

R′ is a monovalent or divalent organic radical and n is 1 or 2, provided that R′ is the same as R when n is 1, and HS—R′ is the same as R when n is 2, or a disulfide compound of the following formula

wherein two R's are identical or different, and each represents a monovalent organic radical.

This method has the advantage that the first vinyl chloride polymer containing a sulfide linkage in the polymer chain can be easily produced.

The chain transfer agent may be at least one mercapto compound selected from the group consisting of alkyl mercaptans, mercaptoalkanols, mercaptocarboxylic acids, esters of the mercaptocarboxylic acids, dimercaptans and thiol-s-triazines, or a disulfide compound.

Examples of preferred chain transfer agents include linear or branched alkylmercaptans containing 1 to 18 carbon atoms such as n-butylmercaptan, tertiary hexylmercaptan, n-octylmercaptan, dodecylmercaptan and stearylmercaptan; mercaptoalkanols containing 2 or 3 carbon atoms such as 2-mercaptoethanol, 2-mercaptopropanol, thiopropylene glycol and thioglycerol; mercaptocarboxylic acids containing 2 to 4 carbon atoms such as thiohydroacrylic acid, thiolactic acid and thiomalic acid; esters between mercaptocarboxylic acids contaniing 2 to 4 carbon atoms and linear or branched alkanols containing 1 to 8 carbon atoms, such as methyl thioglycollate, ethyl thioglycollate and α-ethylhexyl thiolglycollate; linear or branched dimercaptans having 2 to 4 carbon atoms such as propylene dithiol, 1,4-butane dithiol, and ethane 1,2-dithiol; thiol-s-triazines, for example 2,4-disubstituted-6-thiol-s-triazines such as α-dibutylamino-4-naphthoxy-6-thiol-s-triazine and α-anilino-4-methoxy-6-thiol-s-triazine, and 2-substituted-4,6-dithiol-s-triazines such as α-dibutylamino-4,6-dithiol-s-triazine; and disulfide compounds such as dialkyl disulfides having alkyl groups containing 1 to 18 carbon atoms such as dimethyl disulfide, diethyl disulfide, dibutyl disulfide, dioctyl disulfide, dilauryl disulfide, and distearyl disulfide, and dithiodiglycollic acid.

When the mercapto compound containing one or two mercapto groups is used as a chain transfer agent, the polymerization reaction is considered to take place according to the following reaction scheme.

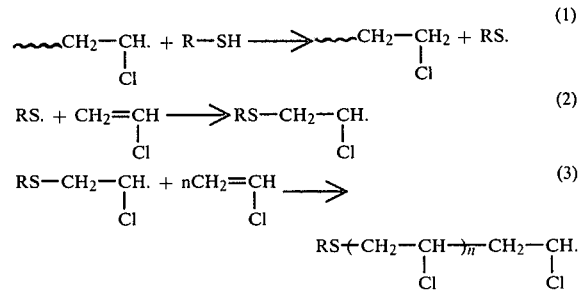

The reaction (1) is a chain transfer reaction in which the chain transfer agent reacts with the radical of the growing chain to terminate the chain propagation are reacted simultaneously form a new radical (RS.). The reaction (2) is an initiation reaction in which the radical RS. so generated adds to the vinyl chloride monomer to initiate the polymerization reaction. The reaction (3) represents a growing reaction in which vinyl monomers and successively. The end of the growing chain formed by the reaction (3) is terminated by the reaction (1) to produce a polymer having the group RS— in the polymer chains.

The above reaction scheme shows a polymerization reaction which proceeds most typically. There may take place at the same time a substitution reaction shown by the following scheme

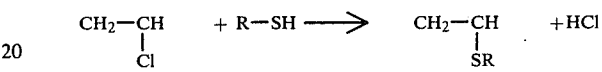

[see "Vinyl Chloride and Polymer", 12 (12) 33, 1973)], or an addition reaction of the following scheme

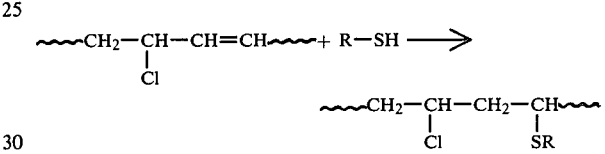

as subsidiary reactions.

According to the above substitution reaction or the addition reaction, sulfide linkages may be bonded not only to the polymer chain ends but also to the polymer chain. In any case, a greater portion of the fragments of the chain transfer agent are bonded to the molecular ends, and the product can be used as the first vinyl chloride polymer having a low molecular weight in accordance with this invention.

As is clearly seen from the above reaction schemes, the first vinyl chloride polymer used in the present invention contains a polymer chain not containing a sulfide linkage in the polymer chain ends, but such a polymer can be used in this invention if it contains 0.01 to 2% by weight of the sulfur atoms of the sulfide linkage in the polymer chain.

Investigations of the present inventors have also shown that the composition of this invention shows improved heat stability and processability even when the first vinyl chloride polymer is a polymer having a sulfide linkage in the polymer chain or both in the polymer chain and at the polymer chain ends which is obtained by using a monomer having a sulfide linkage, such as $CH_2=CH$–$(CH_2)_2SR$ or $CH_2=CH$—$SR$ in which R is preferably an alkyl group having 1 to 12 carbon atoms, as the comonomer copolymerizable with vinyl chloride.

The vinyl chloride polymer composition of this invention is prepared by mixing the aforesaid first vinyl chloride polymer with the aforesaid second vinyl chloride polymer.

The number of sulfide linkages of the first vinyl chloride polymer having a lower molecular weight naturally decreases as its molecular weight increases. Accordingly, preferred first vinyl chloride polymers having a lower molecular weight and containing a sulfide linkage in the polymer chain, especially at the polymer chain ends, are those having a weight average degree of polymerization of about 100 to about 800, especially about 100 to about 600.

Preferred second vinyl chloride polymers having a higher molecular weight are those having a weight average degree of polymerization of about 600 to about 4000, preferably about 600 to about 2000. These polymers are readily available because vinyl chloride polymers having a weight average degree of polymerization of at least about 600 are well used as molding materials in blow molding, injection molding or extrusion molding which require excellent heat stability at the time of molding. When the weight average degree of polymerization of this polymer is less than about 600, a composition obtained by mixing this polymer with the first vinyl chloride polymer containing a sulfide linkage in the polymer chain shows a smaller degree of improvement in heat stability.

Investigations of the present inventors have shown that as far as the molecular weight is concerned, preferred embodiments of the present invention are a combination of a vinyl chloride polymer having a weight average degree of polymerization of about 300 to about 600 and containing a sulfide linkage in the polymer chain as the first polymer with a vinyl chloride polymer having a weight average degree of polymerization of at least about 1,000 as the second polymer, and a combination of a vinyl chloride polymer having a weight average degree of polymerization of about 100 to about 500 and containing a sulfide linkage in the polymer chain as the first polymer with the second vinyl chloride polymer having a weight average degree of polymerization of about 600 to about 1,000 as the second polymer.

The two vinyl chloride polymers having different molecular weights can generally be mixed at such a ratio that 1 part by weight of the first vinyl chloride polymer is mixed with 1 to 19 parts by weight of the second vinyl chloride polymer.

If the amount of the second vinyl chloride polymer exceeds 19 parts by weight per part by weight of the first vinyl chloride polymer, the effect of improving heat stability by the addition of the first vinyl chloride polymer is small. Moreover, when the proportion of the second vinyl chloride polymer is less than 1 part by weight, the heat stability of the resulting composition is not improved to an extent corresponding to the larger proportion of the first vinyl chloride polymer.

According to the most preferred embodiment of this invention, the mixing ratio between the first vinyl chloride polymer and the second vinyl chloride polymer can be varied depending upon the weight average degrees of polymerization of the two polymers. For example, when a vinyl chloride polymer having a weight average degree of polymerization of 300 as the first polymer is mixed with a vinyl chloride polymer having a weight average degree of polymerization of 1500 as the second polymer, the proportion of the former is desirably 5 to 20% by weight. In the case of a mixture of a vinyl chloride polymer having a weight average molecular weight of 500 as the first polymer and a vinyl chloride polymer having an average weight average degree of polymerization of 700 as the second polymer, the proportion of the former is desirably 10 to 50% by weight.

The composition of this invention may further include additives known in the art, such as heat stabilizers, antioxidants, ultraviolet absorbers, plasticizers, lubricants, pigments, and fillers.

Examples of these additives include heat stabilizers such as inorganic lead salts (e.g., tribasic lead sulfate, dibasic lead phosphite, basic lead sulfite, lead silicate and basic lead carbonate), metal soaps formed between organic acids (e.g., stearic acid, maleic acid, lauric acid, palmitic acid, ricinoleic acid, adipic acid, benzoic acid) and epoxysuccinic acid and metals (e.g., lead, cadmium, barium, calcium, strontium and zinc), organotin compounds (e.g., dibutyltin maleate, dioctyltin maleate, dibutyltin laurate, dioctyltin oxide and dioctyltin mercaptide), epoxy compounds (e.g., epoxidized soybean oil), and phosphites (e.g., triphenyl phosphite and tridecyl phosphite); antioxidants such as amines (e.g., phenyl p-octylamine and para-isopropyldiphenylamine), phenols (e.g., 2,4-dimethyl-6-tert.butylphenol and 3-methyl-2,6-ditert.butylphenol), disalicylydene ethylenediamine, 2,2-bis(4hydroxyphenyl)propane, and phenothiazine; ultraviolet absorbers such as benzophenones (e.g., 2,4-dihydroxybenzophenone and 2-hydroxy-4-methoxybenzophenone), salicylates (e.g., phenyl salicylate and p-octylphenyl salicylate), resorcinol monobenzoate and 3-phenylcinnamate; lubricants such as phthalate esters (e.g., dioctyl phthalate and dibutyl phthalate), aliphatic dibasic acid estess (e.g., diisodecyl succinate and dioctyl adipate), glycol esters (e.g., diethylene glycol dibenzoate), phosphate esters (e.g., trioctyl phosphate and triphenyl phosphate), epoxy compounds (e.g., epoxidized soybean oil and epoxidized linseed oil), chlorinated paraffin, trioctyl trimellitate, fatty acids (e.g., lauric acid and stearic acid), fatty acid amides (e.g., stearamide and palmitamide), esters (e.g., butyl stearate, hardened castor oil and ethylene glycol monostearate), alcohols (e.g., cetyl alcohol and stearyl alcohol), and metal soaps (e.g., lead stearate and calcium stearate); pigments such as titanium oxide, basic lead carbonate, ochre, lithol red and Hansa Yellow G; and fillers such as carbon black, white carbon, calcium carbonate, basic magnesium carbonate, clay, silicate minerals, barium sulfate, metal powders, asbestos, glass fibers, chlorinated polyethylene, acrylonitrile-butadiene-styrene copolymer and methylmethacrylate-butadiene-styrene copolymer.

The amounts of the additives vary depending upon the purpose of using the vinyl chloride polymer composition of this invention, etc. Generally, per 100 parts by weight in total of the first vinyl chloride polymer containing a sulfide linkage in the polymer chain and the second vinyl chloride polymer having a higher molecular weight, 0.1 to 10 parts by weight of the heat stabilizers, 0 to 1 parts by weight of the antioxidants, 0 to 0.5 part by weight of the ultraviolet absorbers, 0 to 5 parts by weight of the lubricants, 0 to 150 parts by weight of the plasticizers, 0 to 5 parts by weight of the pigments, and 0 to 100 parts by weight of the fillers can be used.

The vinyl chloride polymer composition of this invention is obtained by well mixing the predetermined amounts of the individual polymers at room temperature or at an elevated temperature using a known mixer such as a ribbon blender, and if desired, further mixing the product with additives of the types exemplified hereinabove; or by kneading the resulting mixture by a mixing roll, a Banbury mixer, an extruder, etc. under pressure at a temperature of 50° to 180° C., and if desired, pelletizing the product with a cutter.

Thus, according to this invention, a vinyl chloride polymer composition is provided which has excellent heat stability and processability, especially the former.

It is not entirely clear why the vinyl chloride polymer composition of this invention exhibits outstanding heat stability. The present inventors, however, theorize as follows:

Heat decomposition of the vinyl chloride polymer during molding occurs because the chlorine atoms adjacent the double bond are thermally unstable, and therefore, during molding, are successively liberated as hydrogen chloride. This heat decomposition reaction scarcely occurs or is prevented substantially in the first vinyl chloride polymer because sulfide linkages are present in the polymer chain or at the polymer chain ends. Even if a chlorine atom adjacent the sulfide linkage is liberated and forms a radical, the electron-sharing property of the sulfur atom serves to stabilize the radical and to decrease the rate of decomposition.

The heat stability of the composition of this invention is also improved as a whole because the first vinyl chloride polymer has a relatively low melting temperature. Especially when the composition contains a stabilizer, the dispersion of the stabilizer is improved by the presence of the first vinyl chloride polymer, thus contributing further to the improvement of heat stability.

The reaction between the sulfide linkages and the chain of the vinyl chloride polymer, of which possibility is scarce however, is considered to contribute to not a small extent to the superior heat stability of the composition of this invention.

The vinyl chloride polymer composition of this invention can be used suitably as a molding material for use in blow molding, injection molding or extrusion molding.

The following Examples and Comparative Examples illustrate the present invention more specifically. It should be understood however that the scope of the invention is not limited by these specific examples.

The weight average degree of polymerization($\bar{P}w$) as used in the present application is determined in accordance with the method of JIS K-6721 as follows:

The specific viscosity of a solution of polyvinyl chloride in nitrobenzene (0.4 g/100 ml) at 30° C. by an Ostwald viscometer. The intrinsic viscosity $[\eta]$ is calculated from the following equation, and $\bar{P}w$ is calculated in accordance with the following equation.

$$[\eta] = \frac{\sqrt{2}}{c} \sqrt{\eta sp - \ln \eta rel}$$

$$\bar{P}w = 500 \left( \text{ant log}_{10} \frac{[\eta]}{0.168} - 1 \right)$$

wherein
$[\eta]$ is the intrinsic viscosity
$\eta sp$ is the specific viscosity
$\eta rel$ is the relative viscosity
c is the concentration of the polymer (g of polymer/dl of solvent).

For the purpose of this invention, it is assumed that the above equations are applicable both to a homopolymer of vinyl chloride and to copolymers of vinyl chloride.

EXAMPLE 1

(1) A 10-liter stainless steel autoclave was charged with 5 kg of deionized water having dissolved therein 6 g of partially saponified polyvinyl alcohol (the degree of saponification 80%) and 3 g of methyl cellulose, and the amounts indicated in Table 1 of dodecyl mercaptan and tertbutyl perpivalate. The autoclave was evacuated, and 2.5 kg of vinyl chloride monomer was fed into it and polymerized at 60° C. for 3 hours with stirring to form polyvinyl chloride having dodecyl mercapto groups and the weight average degree of polymerization shown in Table 1 (first polymer). The polyvinyl chloride was washed thoroughly with a large amount of methanol, and then dried under reduced pressure.

For comparison, polyvinyl chloride having no mercapto group (first polymer) was produced in the same way as above except that carbon tetrachloride was used as a chain transfer agent instead of dodecyl mercaptan.

The results obtained are shown in Table 1.

TABLE 1

| Sample | Chain transfer agent Compound | Amount (g) | t-Butyl perpivalate (g) | Polymerization temperature (°C.) | Weight average degree of polymerization ($\bar{P}w$) |
|---|---|---|---|---|---|
| A | Dodecylmercaptan | 8 | 3 | 60 | 540 |
| B | " | 40 | 6 | " | 320 |
| C | Doecylmercaptan | 200 | 15 | " | 200 |
| D | Dodecylmercaptan | 1000 | 20 | " | 130 |
| E | Carbon tetrachloride | 400 | 10 | 60 | 410 |
| F | " | 1600 | 15 | " | 220 |
| G | Not used | — | 2.5 | 70 | 580 |
| H | Not used | — | 1.8 | 80 | 430 |

(2) The polyvinyl chloride so obtained and higher-molecular-weight polyvinyl chloride as the second polymer (700 D, a product of Sun Arrow Chemical Co., Ltd.; weight average degree of polymerization 1020) were blended with tribasic lead sulfate, lead stearate and stearic acid as stabilizers and lubricant were blended by a Henschel mixer in accordance with the following formulation.

| | |
|---|---|
| Total amount of polyvinyl chlorides | 100 parts by weight |
| Tribasic lead sulfate | 2 parts by weight |
| Lead stearate | 2 parts by weight |

-continued

| | |
|---|---|
| Stearic acid | 0.2 part by weight |

The resulting composition was kneaded at 170° C. for 5 minutes by using a mixing roll to form a sheet having a thickness of 1 mm. The sheet was subjected to a heat a deterioration test in a 180° C. circulating air oven, and the blackening time was measured.

Table 2

| Polyvinyl chloride (PVC) | | Mixing proportions (parts by weight) | | | | | | | | | | |
|---|---|---|---|---|---|---|---|---|---|---|---|---|
| | | Invention | | | | | | Comparison | | | | |
| | | 1 | 2 | 3 | 4 | 5 | 6 | 1' | 2' | 3' | 4' | 5' |
| Higher-molecular-weight PVC $\bar{P}w = 1020$ | | 90 | 70 | 90 | 80 | 90 | 95 | 100 | 90 | 90 | 90 | 90 |
| Lower-molecular-weight PVC of the invention (*1) | Sample A | 10 | 30 | 0 | 10 | 0 | 0 | 0 | 0 | 0 | 0 | 0 |
| | Sample B | 0 | 0 | 10 | 0 | 0 | 0 | 0 | 0 | 0 | 0 | 0 |
| | Sample C | 0 | 0 | 0 | 10 | 10 | 0 | 0 | 0 | 0 | 0 | 0 |
| | Sample C | 0 | 0 | 0 | 0 | 0 | 5 | 0 | 0 | 0 | 0 | 0 |
| Lower-molecular-weight PVC outside the scope of the invention (*1) | Sample E | 0 | 0 | 0 | 0 | 0 | 0 | 0 | 10 | 0 | 0 | 0 |
| | Sample F | 0 | 0 | 0 | 0 | 0 | 0 | 0 | 0 | 10 | 0 | 0 |
| | Sample G | 0 | 0 | 0 | 0 | 0 | 0 | 0 | 0 | 0 | 10 0 | |
| | Sample H | 0 | 0 | 0 | 0 | 0 | 0 | 0 | 0 | 0 | 0 | 10 |
| Heat stability (minutes) | | 140 | 130 | 150 | 150 | 135 | 140 | 110 | 100 | 90 | 105 | 100 |
| Coloration at the early stage (*2) | | 2 | 2 | 1 | 1 | 1 | 1 | 3 | 3 | 2 | 3 | 2 |

(*1): The letters designating the samples correspond to those shown in Table 1.
(*2): 1: coloration barely detectable; 2: slight coloration; 3: coloratio occurred

EXAMPLE 2

(1) In each run, lower-molecular weight polyvinyl chloride (PVC) having a sulfide linkage (first polymer) was prepared in the same way as in Example 1, (1) except that each of the chain transfer agents indicated in Table 3 was used. The results are shown in Table 3.

TABLE 3

| Sample | Chain transfer agent | | Peroxide (g) | Polymerization temperature (°C.) | $\bar{P}w$ |
|---|---|---|---|---|---|
| | Compound | Amount (g) | | | |
| I | 2-Mercaptoethanol | 28 | 3.5 | 60 | 260 |
| J | α-Thioglycerol | 300 | 10 | " | 120 |
| K | Thioglycollic acid | 25 | 3 | " | 210 |
| L | Ethane-1,2-dithiol | 15 | 3 | " | 300 |
| M | α-Dibutyl amino-4,6-dithiol-s-triazine | 60 | 6 | 60 | 510 |
| N | 4,4'-Dithioglycollic acid | 30 | 3.5 | 55 | 490 |
| O | Dioctyl disulfide | 30 | 4 | 60 | 540 |

(2) The resulting lower-molecular-weight polyvinyl chloride (first polymer) and higher-molecular-weight polyvinyl chloride (700 D, a product of Sun Arrow Co., Ltd.; the weight average molecular weight 1020) (second polymer) in the amounts shown in Table 4, and the same stabilizers and lubricant as used in Example 1, (2) in the same amounts were blended, and formed into a sheet. The heat stability and the coloration at the early stage were examined. The results are shown in Table 4.

TABLE 4

| | Polyvinyl chloride composition | | | | |
|---|---|---|---|---|---|
| | | Higher-molecular-weight PVC (parts by weight) | Lower-molecular-weight PVC | | Heat stability (min.) | Coloration in the early stage (*1) |
| Run No. | | | Sample | Parts by weight | | |
| Invention | 1 | 90 | I | 10 | 145 | 2 |
| | 2 | " | J | " | 160 | 1 |
| | 3 | " | K | " | 130 | 3 |
| | 4 | " | L | " | 160 | 1 |
| | 5 | " | M | " | 150 | 1 |
| | 6 | " | N | " | 135 | 2 |
| | 7 | 80 | O | 20 | 150 | 1 |
| Comparison | | 100 | Not used | | 110 | 3 |

(*1) Same as the footnote (*2) to Table 2.

EXAMPLE 3

In each run, each of the polyvinyl chlorides and vinyl chloride copolymers (second polymer) shown in Table 5, each of the lower-molecular-weight polyvinyl chlorides (first polymer) shown in Table 5, and the same stabilizers and lubricant as used in Example 1, (2) were blended in the same proportions as indicated in Example 1, (2). The mixture was formed into a sheet in the same say as in Example 1, and tested for heat stability. The results are shown in Table 5.

For comparison, the heat stabilities of compositions composed of each of the higher-molecular-weight vinyl chloride polymers or copolymers and the same ingredients as mentioned above were also determined, and the results are shown in Table 5.

TABLE 5

| | | Higher-molecular-weight PVC | | | | Lower-molecular-weight PVC | | |
|---|---|---|---|---|---|---|---|---|
| Run No. | | Type | Vinyl chloride content (wt. %) | $\bar{P}w$ | Mixing proportion (parts by weight) | Sample | Mixing proportion (parts by weight) | Heat stability (minutes) |
| Invention | 1 | Polyvinyl chloride | 100 | 1320 | 90 | B | 10 | 150 |
| | 2 | Polyvinyl chloride | 100 | 720 | 90 | I | 10 | 140 |

TABLE 5-continued

| Run No. | Type | Higher-molecular-weight PVC Vinyl chloride content (wt. %) | $\bar{P}w$ | Mixing proportion (parts by weight) | Lower-molecular-weight PVC Sample | Mixing proportion (parts by weight) | Heat stability (minutes) |
|---|---|---|---|---|---|---|---|
| 3 | Vinyl chloride/propylene copolymer | 98 | 620 | 85 | C | 15 | 140 |
| 4 | Vinyl chloride/vinyl acetate copolymer | 95 | 750 | 90 | I | 10 | 110 |
| Comparison 1" | Polyvinyl chloride | 100 | 1320 | 100 | — | — | 120 |
| 2' | Polyvinyl chloride | 100 | 720 | 100 | — | — | 90 |
| 3' | Vinyl chloride/propylene copolymer | 98 | 620 | 100 | — | — | 90 |
| 4' | Vinyl chloride/vinyl acetate copolymer | 95 | 750 | 100 | — | — | 70 |

EXAMPLE 4

(1) A 10-liter stainless autoclave was charged with 5 kg of deionized water having dissolved 8 g of partially saponified polyvinyl alcohol (the degree of saponification 80%) and 4 g of methyl cellulose therein, 10 g of tert.butyl perpivalate and 250 g of dodecyl mercaptan. The autoclave was evacuated, and 1.2 kg of vinyl chloride monomer and each of the comonomers shown in Table 6 were fed and polymerized at 50° C. for 3 hours to form vinyl chloride polymers of a low molecular weight having dodecylmercapto groups. Each of the copolymers obtained was thoroughly washed with a large amount of methanol, and dried under reduced pressure.

TABLE 6

| | Comonomer | | Vinyl chloride copolymer | |
|---|---|---|---|---|
| Sample | Compound | Amount Charged (g) | Vinyl chloride content (wt. %) | $\bar{P}w$ |
| P | Ethylvinyl ether | 350 | 95 | 230 |
| Q | Glycidyl methacrylate | 20 | 97 | 290 |

(2) Ten parts by weight of each of the resulting lower-molecular-weight vinyl chloride copolymers (first polymer) and 90 parts by weight of higher-molecular-weight polyvinyl chloride (the weight average degree of polymerization 1020) (second polymer) and the same stabilizers and lubricant as used in Example 1, (2) in the same amounts were blended, and formed into a sheet. The heat stability of the sheet was then examined. The results are shown in Table 7.

TABLE 7

| | Higher-molecular-weight PVC (parts by weight) | Lower-molecular-weight PVC Sample | Parts by weight | Heat stability (minutes) |
|---|---|---|---|---|
| Invention 1 | 90 | P | 10 | 130 |
| Invention 2 | 90 | Q | 10 | 130 |
| Comparison | 100 | — | — | 110 |

EXAMPLE 5

One hundred parts by weight of a composition composed of 90% by weight of higher-molecular-weight polyvinyl chloride (weight average degree of polymerization 1020) and 10% by weight of the lower-molecular-weight polyvinyl chloride (sample A shown in Table 1) were mixed with 2 parts by weight of dibutyltin maleate and 1 part by weight of dibutyltin laurate, and the mixture was well stirred. Then the mixture was kneaded on a mixing roll at 165° C. for 5 minutes to form a sheet having a thickness of 1 mm. When the sheet was subjected to a heat deterioration test in a 180° C. circulating air oven, the blackening time of this sheet was 150 minutes.

For comparison, a sheet was produced in the same way as above except that 100% high-molecular-weight polyvinyl chloride was used instead of the polyvinyl chloride composition. The blackening time of this sheet was found to be 120 minutes.

EXAMPLE 6

One hundred parts by weight of a composition composed of 90% by weight of higher-molecular-weight polyvinyl chloride (weight average degree of polymerization, 1320) and 10% by weight of the lower-molecular-weight polyvinyl chloride containing dodecyl mercapto groups (sample B shown in Table 1) were mixed with 40 parts by weight of dioctyl phthalate, 1 part by weight of titanium oxide, 1 part by weight of zinc stearate, 1 part by weight of calcium stearate, 2 parts by weight of epoxidized soybean oil, 0.5 parts by weight of tridodecyl phosphite, 0.1 parts by weight of 2,4-dimethyl-tertbutylphenol, and 0.1 parts by weight of 2,4-dihydroxybenzoate and the composition was well mixed. Then, the composition was milled for 5 minutes at 160° C. by using a two-roll mixing mill to produce a 1 mm thick sheet for heat aging. When the sheet was subjected to a heat deterioration test in a 180° C. circulating air oven, the blackening time was 50 minutes.

For comparison, a sheet was produced in the same way as above except that 100% higher-molecular-weight polyvinyl chloride was used without addition of the lower-molecular weight polyvinyl chloride. The blackening time of this sheet was found to be 30 minutes.

EXAMPLE 7

One hundred parts by weight of a composition composed of 50% by weight of higher-molecular-weight polyvinyl chloride (weight average degree of polymerization, 720), 40% by weight of the lower-molecular-weight polyvinyl chloride (containing dodecylsulfide groups) (sample A shown in Table 1), and 10% by weight of styrenebutadiene copolymer (the content of styrene, 15 wt%; molecular weight, 120,000) were mixed with 1.5 parts by weight of calcium stearate, 0.5 parts by weight of zinc stearate, 3 parts by weight of epoxidized soybean oil, 0.5 parts by weight of trioctyl phosphite, 0.5 parts by weight of stearic acid, and 0.3 parts by weight of polyethylene wax, and the composition was well mixed. Then, the composition was milled for 5 minutes at 160° C. by using a two-roll mixing mill to produce a 1 mm thick sheet for heat aging. When the sheet was subjected to heat deterioration test in a 180° C. circulating air oven, the blackening time was 60 minutes.

For comparison, a sheet was produced in the same way as above except that 90% by weight of the higher-molecular-weight polyvinyl chloride and 10% by weight of the styrene-butadiene copolymer were used without addition of the lower-molecular-weight polyvinyl chloride. The blackening time of this sheet was 45 minutes.

EXAMPLE 8

In each run, the lower-molecular-weight polyvinyl chloride containing dodecyl mercapto groups obtained in Example 1, (1) higher-molecular-weight polyvinyl chloride having a weight average degree of polymerization of 1020, stabilizers and a lubricant were blended by a Henschel mixer in accordance with the following formulation.

| | |
|---|---|
| Total amount of the polyvinyl chlorides | 100 parts by weight |
| Tribasic lead sulfate | 1.5 parts by weight |
| Dibasic lead sulfate | 1.0 parts by weight |
| Lead stearate | 1.5 parts by weight |
| Stearic acid | 0.2 parts by weight |

The resulting mixture was kneaded by a mixing roll at 170° C. for 5 minutes to form a sheet having a thickness of 1 mm.

With regard to the sheet, the flowability of the composition of this invention was measured by using a Koka-type flow tester (a product of Shimazu Co.). The die used has a diameter of 0.2 mm and a length of 5 mm. The flow rate (the rate of descending) of the composition was measured at a temperature of 180° C. under a pressure of 400 kg/cm$^2$. The results are shown in Table 8.

The aforesaid sheet was heated at 175° C. for 10 minutes, and then pressed for 10 minutes at a pressure of 60 kg/cm$^2$ to afford a sheet having a thickness of 1 mm for a tensile test. The sheet was subjected to a tensile test by using TENSILON (a product of Toyo Baldwin Co.) in accordance with the method of JIS K-6734. Specifically, a dumbell specimen having a distance between indicator lines of 40 mm and a width at the parallel part of 10 mm was punched out from the compression-molded PVC sheet, and its stress-strain curve was determined at a temperature of 23° C. and a humidity of 50% and at a tensile speed of 10 mm/min. From the resulting curve, the tensile strength and elongation at break of the sample were measured.

The fusion time of the mixture of the lower molecular-weight polyvinyl chloride and higher-molecular-weight polyvinyl chloride obtained by blending in a Henschel mixer at room temperature was measured by means of a Brabender plastograph. Specifically, 60 g of the mixture was weighed, and put into a roller mixer, type W50EC of the Brabender plastograph, and the curve of the kneading resistance torque versus the kneading time was measured at 170° C. and 50 rpm. The time at which the kneading resistance torque became maximum was defined as the fusion time.

The results of these tests are also shown in Table 8.

For comparison, Table 8 also shows the results obtained with higher-molecular-weight polyvinyl chloride composition alone.

TABLE 8

| | | Mixing proportions (parts by weight) | | | | |
|---|---|---|---|---|---|---|
| | | Invention | | | | Comparison |
| Polyvinyl chloride | | 1 | 2 | 3 | 4 | |
| Higher-molecular-weight PVC Pw = 1020) | | 90 | 90 | 80 | 90 | 100 |
| Lower-molecular-weight PVC | Sample B | 10 | 0 | 0 | 0 | 0 |
| | Sample C | 0 | 10 | 0 | 0 | 0 |
| | Sample C | 0 | 0 | 20 | 0 | 0 |
| | Sample D | 0 | 0 | 0 | 10 | 0 |
| Tensile strength (kg/cm$^2$) | | 570 | 585 | 590 | 575 | 550 |
| Elongation at break (%) | | 155 | 160 | 170 | 155 | 140 |
| Fusion time (minutes) | | 5.5 | 4.1 | 3.0 | 3.5 | 11.0 |
| Amount of descending in a flow tester (cm/min. at 180°) | | 1.48 | 1.59 | 1.85 | 1.76 | 1.14 |

EXAMPLE 9

(1) Low-molecular-weight polyvinyl chloride having a weight average degree of polymerization of 480 and containing 2-hydroxyethyl sulfide linkages was produced in the same way as in Example 1, (1) by polymerizing vinyl chloride monomer using 6 g of 2-mercaptoethanol as a chain transfer agent and 2.5 g of lauroyl peroxide as an initiator.

(2) Twenty parts by weight of the resulting lower-molecular-weight polyvinyl chloride and 80 parts by weight of higher-molecular-weight polyvinyl chloride (1400H, a product of Sun Arrow Chemical Co., Ltd.; the weight average degree of polymerization=1400) were blended with the same stabilizers and lubricant as used in Example 1, (2) in the same amounts, and formed into a sheet in the same way as in Example 1, (2). In a heat stability test, the blackening time of the sheet was 160 minutes.

For comparison, the blackening time of the higher-molecular-weight PVC was measured, and found to be 125 minutes.

COMPARATIVE EXAMPLE 1

Lower-molecular-weight containing no sulfide linkage was produced in the same way as in Example 1, (1) using carbon tetrachloride as a chain transfer agent.

Ten parts by weight of the resulting lower-molecular-weight polyvinyl chloride, 90 parts by weight of polyvinyl higher-molecular-weight polyvinyl chloride, and 0.3 parts by weight of each of the sulfur-containing compounds indicated in Table 9 were blended in the same way as in Example 1, (2), and rolled into a sheet.

The coloration in the early stage and heat stability of the rolled sheet were measured, and the results are shown in Table 9.

TABLE 9

| Run No. | Sulfur-containing compounds | Coloration in the early stage (*1) | Heat stability (minutes) |
|---|---|---|---|
| 1 | t-Butyl thiophenol | 2 | 100 |
| 2 | 2-Mercaptoimidazole | 1 | 60 |
| 3 | 2-Mercaptothiazole | 3 | 75 |
| 4 | 2-Ethylhexyl thioglycollate | 3 | 20 |
| 5 | Dodecyl mercaptan | 1 | 90 |
| 6 | α-Thioglycerol | 3 | 30 |
| 7 | Not used | 2 | 95 |
| 9 | Not used (only the polyvinyl chloride having $\bar{P}w = 1020$) | 2 | 110 |

(*1): Same as the footnote to Table 2.

COMPARATIVE EXAMPLE 2

A 2-liter stainless steel autoclave was charged with 1 kg of deionized water having dissolved therein 1.5 g of partially saponified polyvinyl alcohol (the degree of saponification 80%) and 0.6 g of methyl cellulose, 3 g of an oxidation inhibitor having mercapto groups as shown in Table 10, and 1.0 g of t-butyl perpivalate. The autoclave was evacuated, and 0.4 kg of vinyl chloride monomer was fed, and polymerized with stirring at 60° C. for 4 hours. The resulting lower-molecular-weight polyvinyl chloride (first polymer) was centrifuged, and dried under reduced pressure. Then, 10 parts by weight of the lower-molecular-weight polyvinyl chloride and 90 parts by weight of higher-molecular-weight polyvinyl chloride (the weight average degree of polymerization 1020) were blended with the same stabilizers and lubricant in the same amounts by the same method as in Example 1, and the blend was formed into a sheet in the same way as in Example 1. The heat stability of the sheet was examined. The results are shown in Table 11. Table 11 also gives the heat stability of the higher-molecular-weight polyvinyl chloride alone.

TABLE 10

| Run No. | Chain transfer agent | Yield (g) | $\bar{P}w$ | Appearance of PVC |
|---|---|---|---|---|
| 1 | t-Butyl thiophenol | 85 | 470 | Turned yellow |
| 2 | 2-Mercaptoimidazole | 50 | 530 | White |

Table 11

| Amount in parts by weight of the higher-molecular-weight PVC | Lower-molecular-weight PVC | | Initial coloration (*1) | Heat stability (minutes) |
|---|---|---|---|---|
| | Sample No. | Amount in parts by weight | | |
| 90 | 1 | 10 | 3 (*2) | 90 |
| 90 | 2 | 10 | 2 | 50 |
| 100 | — | — | 2 | 110 |

(*1): Same as in Example 1
(*2): Heavily colored to light brown.

What we claim is:

1. A vinyl chloride polymer composition comprising an intimate mixture of a first vinyl chloride polymer containing a sulfide linkage and a hydroxyl group in the molecular chain, which is obtained by radical polymerization in the presence of, as a chain transfer agent, a mercaptoalkanol compound containing 2 or 3 carbon atoms, and a second vinyl chloride polymer having a higher molecular weight than the first polymer.

2. The composition of claim 1 wherein said first vinyl chloride polymer is a homopolymer of vinyl chloride having a low molecular weight and containing a sulfide linkage and a hydroxyl group in the molecular chain.

3. The composition of claim 1 wherein said first vinyl chloride polymer is a copolymer of vinyl chloride with an ethylenically unsaturated monomer copolymerizable with it, which contains a sulfide linkage and a hydroxyl group in the molecular chain.

4. The composition of claim 3 wherein said first vinyl chloride copolymer contains at least 70% by weight of a unit derived from the vinyl chloride monomer.

5. The composition of claim 4 wherein the proportion of the vinyl chloride unit is at least 80% by weight.

6. The composition of claim 1 wherein said first vinyl chloride polymer contains 0.01 to 2% by weight of sulfur atoms which form said sulfide linkage.

7. The composition of claim 6 wherein the content of sulfur atoms is 0.05 to 1% by weight.

8. The composition of claim 1 wherein said second vinyl chloride polymer is a homopolymer of vinyl chloride.

9. The composition of claim 1 wherein said second vinyl chloride polymer is a copolymer of vinyl chloride and an ethylenically unsaturated monomer copolymerizable with it.

10. The composition of claim 9 wherein said copolymer contains at least 70% by weight of a unit derived from the vinyl chloride monomer.

11. The composition of claim 10 wherein the proportion of the vinyl chloride monomer unit is at least 80% by weight.

12. The composition of claim 1 wherein said first vinyl chloride polymer has a weight average degree of polymerization of about 100 to about 800.

13. The composition of claim 1 wherein said second vinyl chloride polymer has a weight average degree of polymerization of about 600 to about 2000.

14. The composition of claim 1 wherein said first vinyl chloride polymer has a weight average degree of polymerization of about 100 to about 600.

15. The composition of claim 1 which comprises an intimate mixture of a first vinyl chloride polymer having a weight average degree of polymerization of about 300 to about 600 and containing a sulfide linkage in the molecular chain and a second vinyl chloride polymer having a weight average degree of polymerization of at least about 1,000.

16. The composition of claim 1 which comprises an intimate mixture of a first vinyl chloride polymer having a weight average degree of polymerization of about 100 to about 500 and containing a sulfide linkage and a hydroxyl group in the molecular chain and a second vinyl chloride polymer having a weight average degree of polymerization of about 600 to about 1,000.

17. The composition of claim 1 which comprises an intimate mixture of 1 part by weight of the first vinyl chloride polymer and 1 to 19 parts by weight of the second polyvinyl chloride polymer.

18. A vinyl chloride polymer composition for molding, comprising an intimate mixture of 100 parts by weight in total of a first vinyl chloride polymer containing a sulfide linkage and a hydroxyl group in the molecular chain and a second vinyl chloride polymer having a higher molecular weight, than the first vinyl chloride polymer 0.1 to 10 parts by weight of a heat stabilizer, 0 to 1 parts by weight of an antioxidant, 0 to 0.5 parts by weight of an ultraviolet absorber, 0 to 5 parts by weight of a lubricant, 0 to 150 parts by weight of a plasticizer, 0 to 5 parts by weight of a pigment and 0 to 100 parts by weight of a filler.

* * * * *